(12) United States Patent
Ishihara

(10) Patent No.: US 8,306,402 B2
(45) Date of Patent: Nov. 6, 2012

(54) TIME SHIFT VIEW/LISTENING SYSTEM, DISPLAY DEVICE, AND TIME SHIFT VIEW/LISTENING METHOD

(75) Inventor: Toshihide Ishihara, Osaka (JP)

(73) Assignee: Panasonic Corporation, Osaka (JP)

( * ) Notice: Subject to any disclaimer, the term of this patent is extended or adjusted under 35 U.S.C. 154(b) by 331 days.

(21) Appl. No.: 12/747,053

(22) PCT Filed: Oct. 7, 2008

(86) PCT No.: PCT/JP2008/002814
§ 371 (c)(1),
(2), (4) Date: Jun. 9, 2010

(87) PCT Pub. No.: WO2009/084139
PCT Pub. Date: Jul. 9, 2009

(65) Prior Publication Data
US 2010/0260471 A1  Oct. 14, 2010

(30) Foreign Application Priority Data

Dec. 28, 2007  (JP) ................................. 2007-339173

(51) Int. Cl.
*H04N 5/92* (2006.01)
*H04N 5/765* (2006.01)
*H04N 7/18* (2006.01)
*H04N 7/16* (2006.01)

(52) U.S. Cl. ........ 386/326; 386/200; 386/230; 386/234; 725/74; 725/80; 725/135; 725/136; 725/139

(58) Field of Classification Search .................. 386/200, 386/230, 234, 326; 725/74, 80, 135, 136, 725/139
See application file for complete search history.

(56) References Cited

U.S. PATENT DOCUMENTS

| 6,204,886 B1 * | 3/2001 | Yoshimura et al. ........... 348/564 |
| 2006/0171659 A1 | 8/2006 | Worrell et al. |
| 2007/0201824 A1 * | 8/2007 | Masaki et al. .................. 386/83 |
| 2009/0245759 A1 * | 10/2009 | Okuyama et al. ............. 386/124 |

FOREIGN PATENT DOCUMENTS

| JP | 2002-125187 A | 4/2002 |
| JP | 2004-186997 A | 7/2004 |
| JP | 2006-331576 A | 12/2006 |
| JP | 2007-214663 A | 8/2007 |
| WO | WO 2005/029854 A1 | 3/2005 |

OTHER PUBLICATIONS

International Search Report for PCT/JP2008/002814, Jan. 6, 2009.
Hitachi Ltd et al, High-Definition Multimedia Interface, Specification Version 1.3a, Nov. 10, 2006, HDMI Licensing LLC.
Supplementary European Search Report for Application No. EP 08 86 6866, Jan. 11, 2011, Panasonic Corporation.

* cited by examiner

*Primary Examiner* — Daquan Zhao
(74) *Attorney, Agent, or Firm* — RatnerPrestia

(57) ABSTRACT

A display device switches a broadcast channel which is being received by a tuner unit based on a broadcast channel switching instruction input from a user operating unit and transmits broadcast channel switching information to a recording and reproduction device. The recording and reproduction device sets a channel of a tuner unit to the same channel as the display device based on the broadcast channel switching information. A content is recorded and reproduced by a recording and reproduction unit based on a time shift viewing/listening instruction, a switch unit of the display device is switched from the tuner unit to the recording and reproduction device, and the reproduction output from the recording and reproduction device is displayed on a display unit.

4 Claims, 10 Drawing Sheets

FIG. 7

| Error factor (parameter values of time shift viewing/listening result notice command) | List of error display text |
|---|---|
| · Non-selectable broadcast<br>· Viewing/listening restricted<br>· No signal<br>· Broadcast type non- processable | Specified broadcast non-recordable |
| · Broadcast of which copy is inhibited<br>· Excess of copy number limit | Broadcast non-recordable due to copy right |
| · In reproduction | Non-recordable due to in reproduction |
| · In recording | Non-recordable due to in programmed recording |
| · Insufficient remaining capacity of medium<br>· Inhibition of writing to medium<br>· Problem with medium | Non-recordable<br>Please check remaining capacity of Recording unit (HDD) |
| · Parental lock | Non-recordable<br>Please check setting of recording and reproduction device |
| · Others | Non-recordable (others) |

FIG. 8

| Transmission direction | Display device → recording and reproduction device |
|---|---|
| Command format | |
| Parameter | msb                                    lsb |
| 1byte | Instruction details ("specify selection of digital channel") |
| 1byte | Digital broadcast type ("ARIB-T"). based on CEC standard |
| 2byte | "Transport_Stream_ID" *1 |
| 2byte | "Service_ID" *2 |
| 2byte | "Original_Netwrok_ID" *3 |
| 2byte | Transmission frequency "Frequency" 0<N<65535 *4<br>Frequency=62.5×N(kHz) |
| Response details of receiver | |
| Operations of devices | Recording and reproduction device is in standby state and specified digital channel is selected if possible |
| Response | None |

*1, *2, *3:   Digital service ID (6 byte). Based on CEC standard

[ARIB data] is specified in the drawing.

*4:    Based on CEC standard (Analog Frequency)

FIG. 9

| | | | | | | | | |
|---|---|---|---|---|---|---|---|---|
| Transmission direction | | Display device → recording and reproduction device ||||||||
| Command format | |||||||||
| Parameter | msb | | | | | | | lsb |
| 1byte | Instruction details ("instruct to start time shift viewing/listening") ||||||||
| 4bit×2 | Recording source ("Digital Service") |||| Digital broadcast type ("ARIB-T") ||||
| 2byte | "Transport_Stream_ID" ||||||||
| 2byte | "Service_ID" ||||||||
| 2byte | "Video PID" ||||||||
| 2byte | "Audio PID" ||||||||
| 1byte | "Mode" |||| "Bilingual Audio Selection" ||||
| 2byte | "Subtitle PID" ||||||||
| 1byte | "Subtitle Language" ||||||||
| Response details of receiver |||||||||
| Operations | Time shift viewing/listening is started when time shift viewing/listening is possible under specified condition. result on whether time shift viewing/listening is started is returned as response ||||||||
| Response | Time shift viewing/listening result notice command FIG.10 ||||||||

FIG. 10

| Transmission direction | Recording and reproduction device → display device |
|---|---|
| Command format | |
| Parameter | msb                          lsb |
| 1byte | Instruction details ("result on whether time shift viewing/listening is started is returned") |
| 1byte | Result on whether time shift viewing/listening is started. based on CEC standard [Record Status Info]. |
| Response details of receiver | |
| Operations | Display device may display error factor FIG. 7 corresponding to result on display unit as needed. however, in case of "Request received", nothing may be displayed or message indicating that more time is necessary for start of time shift viewing/listening may be displayed. |
| Response | None |

*1: When recording and reproduction device cannot notify result at once, "Request received" indicating only reception of command is notified. this is not defined in CEC standard [Record Status Info].

TIME SHIFT VIEW/LISTENING SYSTEM, DISPLAY DEVICE, AND TIME SHIFT VIEW/LISTENING METHOD

This application is a U.S. National Phase Application of PCT International Application PCT/JP2008/002814.

TECHNICAL FIELD

The present invention relates to a time shift viewing/listening system, a display device, and a time shift viewing/listening method, which can permit time shift viewing/listening in the course of receiving television broadcast.

BACKGROUND ART

In general, in addition to reception and viewing/listening of television broadcast, a television receiver can be connected to a video device such as a recording and reproduction device, DVR (Digital Video Recorder) or DVD (Digital Versatile Disc), for example, and can reproduce and view/listen contents recorded in the device or commercially-supplied contents. Accordingly, the television receiver often includes one or more external input terminals in addition to an antenna terminal for receiving the television broadcast. A user can switch the external inputs by the use of a remote controller (hereinafter, referred to as "remote controller") or buttons on the device body as needed.

A tuner is generally mounted on a video device, which can often receive the television broadcast. Accordingly, when it does not reproduce contents accumulated therein, the video device generally outputs the received television broadcast to a display device such as a television receiver. Accordingly, even when a signal input in the external input terminals of the television receiver is switched to the video device, it is possible to view the television broadcast.

Devices or methods of automatically switching an input path of video and audio data in a television receiver using commands exchanged between a display device such as the television receiver and a recording and reproduction device such as a video device have been standardized. The switching of the input path means, for example, that the television receiver switches video and audio data output from a built-in tuner to video and audio data output from a recording and reproduction data connected to an external input terminal and displays the switched video and audio data.

To permit such switching, for example, commands allowing a display device and a recording and reproduction device to operate by interlocking with each other are defined (for example, see Non-Patent Literature 1). For example, when the recording and reproduction device starts the reproduction, the recording and reproduction device issues an output start notice command to the display device. As a result, the display device automatically switches a signal input to the external input terminal of the display device to a signal input from the recording and reproduction device. Then, the recording and reproduction device can display the reproduced contents on the display device.

When a recording and reproduction device which it is desired to use along with the display device is selected by a user's operation and an output start instruction command is sent from the display device to the recording and reproduction device, an output start notice command is sent from the recording and reproduction device to the display device. By exchanging these commands, the signal input to the external input terminal of the display device can be switched to the signal input from the recording and reproduction device and the content reproduced by the recording and reproduction device can be displayed on the display device.

In general, recording and reproduction devices include a hard disc drive (hereinafter, abbreviated as "HDD") as a recording medium in addition to a video tape or a DVD-RAM. The devices including the HDD often have a time shift viewing/listening function with characteristics of the HDD that they have large capacity and random accessibility and can record and reproduce contents at the same time. The time shift viewing/listening function is to reproduce a content in recording while recording the content received by a tuner built in the recording and reproduction device in a recording unit (HDD). Accordingly, by the use of this time shift viewing/listening function, it is possible to view a missed scene of a content again or to reproduce a program in recording in a time shift manner.

Studies for not missing important scenes have been made by outputting the live video, which is being received by the tuner built in the recording and reproduction device, in the course of performing processes of encoding a received signal and decoding a recorded signal accompanied with the recording and reproduction, thereby improving the operational response in appearance (for example, see Patent Literature 1).

However, in the past recording and reproducing apparatuses, when it is intended to start the time shift viewing/listening, the signal input to the external input terminal of the display device should be switched to the signal input from the recording and reproduction device in advance and the content received by a tuner built in the recording and reproduction device should be switched. Accordingly, the content in view cannot be viewed temporarily or the switching should wait for the timing of CM or the like. Therefore, when a content is being viewed by the use of the tuner built in the display device, the switching operation cannot be performed at once.

In this case, even by using the exchange of commands above-mentioned, the operation of switching the content of the tuner built in the recording and reproduction device to the same content as viewed by the use of the tuner built in the display device until then cannot be carried out only by the use of the remote controller of the display device, and it is thus necessary to replace the remote controller of the display device with the remote controller of the recording and reproduction device. A method of exchanging commands with the display device and switching the content of the tuner built in the recording and reproduction device by interlocking with the time shift viewing/listening can be considered at the time of starting the time shift viewing/listening. However, since a channel selecting process of the tuner and a process of encoding output data and converting the encoded data into data recordable on the HDD take a process time, the recording cannot be started at once from the time point where it is intended to start the time shift viewing/listening and thus a head part of a content may be cut off.

The input switching operation to the recording and reproduction device can be generally carried out by the use of the remote controller of the display device, but a time shift viewing/listening execution operation or a special reproduction operation thereafter should be carried out by the use of the remote controller of the recording and reproduction device.

However, in the method described in Patent Literature 1, the signal switching time required for every signal switching due to the selection of a broadcast signal and the process time required for performing a recording and reproduction process can be omitted in appearance at the time of time shift viewing/listening, but any attention has not been paid to the timing of recording the content for the time shift viewing/listening. Accordingly, head scenes of the content recorded in the recording and reproduction device is delayed from the time point where a user presses a time shift viewing/listening start button for the purpose of the time shift viewing/listening by the time corresponding to the signal switching time and the recording process time. As a result, the video and audio data of the content in the period of time corresponding to the delayed time is not recorded on the HDD or the like. When video or audio of an important scene is received exactly at that time, the video or audio of the important scene might not be recorded. In the past method, at the time of time shift viewing/listening, it is necessary to frequently change and operate the remote controller of the display device and the remote controller of the recording and reproduction device, thereby deteriorating the operability and response.

Non-Patent Literature 1: HDMI-CEC (High-Definition Multimedia Interface Specification Version 1.3a—Consumer Electronics Control) Standard Patent Literature 1: Japanese Patent Unexamined Publication No. 2004-186997

SUMMARY OF THE INVENTION

According to an aspect of the invention, there is provided a time shift viewing/listening system including a display device and a recording and reproduction device connected to the display device. Here, the display device includes: a first tuner unit receiving a broadcast wave and outputting a content; an operation input unit inputting a broadcast channel switching instruction and a time shift viewing/listening instruction of the content received by the first tuner unit; a content input unit inputting a content from the recording and reproducing device; a first input switching unit switching an input path of a content between the first tuner unit and the content input unit; a display unit displaying the content input from the first input switching unit; and a first command input and output unit inputting a command from the recording and reproduction device and outputting a command to the recording and reproduction device. The display device further includes a first control unit making a control of switching a broadcast channel of the content received by the first tuner unit based on the broadcast channel switching instruction input from the operation input unit, a control of outputting a channel selection command including information of the switched broadcast channel from the first command input and output unit, a control of outputting a time shift viewing/listening start command instructing to start the time shift viewing/listening from the first command input and output unit based on the time shift viewing/listening instruction, and a control of switching the input switching unit in response to a video output start command input from the first command input and output unit.

The recording and reproduction device includes: a second tuner unit receiving a broadcast wave and outputting a content; a recording and reproduction unit converting the content input from the second tuner unit into recording data and recording and reproducing the recording data; a content output unit outputting recording data of the content, which is recorded in the recording and reproduction unit, to the content input unit of the display device; and a second command input and output unit inputting a command from the first command input and output unit and outputting a command to the first command input and output unit. The recording and reproduction device further includes a second control unit making a control of selecting a channel of the second tuner unit in response to the channel selecting command input from the second command input and output unit, a control of recording and reproducing a content in and from the recording and reproduction device in response to the time shift viewing/listening start command and outputting a content from the content output unit, and a control of outputting an video output start command to switch the input path of the content in the display device from the first tuner unit to the content input unit from the second command input and output unit.

According to this configuration, when the content of the tuner unit built in the display device is switched, the content of the tuner unit built in the recording and reproduction device is switched to the same content as the content converted and started in viewing/listening by the tuner unit built in the display device, thereby omitting the recording content switching operation at the time of starting the time shift viewing/listening. At the same time, a process of encoding a received signal or decoding a recorded signal accompanied with the selection of a channel in the recording and reproduction device can be omitted and the time shift viewing/listening content can be recorded without cutting off a head part, thereby improving the operational response.

According to another aspect of the invention, there is provided a display device connected to a recording and reproduction device to constitute a time shift viewing/listening system, including: a first tuner unit receiving a broadcast wave and outputting a content; an operation input unit inputting a broadcast channel switching instruction and a time shift viewing/listening instruction of the content received by the first tuner unit; a content input unit inputting a content from the recording and reproducing device; a first input switching unit switching an input path of a content between the first tuner unit and the content input unit; a display unit displaying the content input from the first input switching unit; a first command input and output unit inputting a command from the recording and reproduction device and outputting a command to the recording and reproduction device; and a first control unit making a control of switching a broadcast channel of the content received by the first tuner unit based on the broadcast channel switching instruction input from the operation input unit, a control of outputting a channel selection command including information of the switched broadcast channel from the first command input and output unit to the recording and reproduction device, a control of outputting a time shift viewing/listening start command instructing to start the time shift viewing/listening from the first command input and output unit to the recording and reproduction device based on the time shift viewing/listening instruction, and a control of switching the input switching unit in response to an output start command, which is input from the first command input and output unit, from the recording and reproduction device.

According to still another aspect of the invention, there is provided a time shift viewing/listening method in a time shift viewing/listening system having a display device including a first tuner unit and a recording and reproduction device including a second tuner unit and being connected to the display device, the time shift viewing/listening method including the steps of: causing the display device to make a control of switching a broadcast channel of a content received by the first tuner unit based on a broadcast channel switching instruction and to transmit a channel selection command including information of the switched broadcast channel to the recording and reproduction device; causing the recording and reproduction device having received the channel selection command to select a channel of the second tuner unit based on the channel selection command; causing the display device to transmit a time shift viewing/listening start command indicating a start of time shift viewing/listening to the recording and reproduction device based on a time shift viewing/listening instruction; causing the recording and reproduction device having received the time shift viewing/listening start command to record and reproduce a content, to output the content to the display device, and to transmit an output start notice command to the display device; and causing the display device having received the output start notice command to switch an input path of a content from the first tuner unit to the recording and reproduction device.

BRIEF DESCRIPTION OF THE DRAWINGS

FIG. 7 is a diagram illustrating a text message for displaying error factors, which are acquired by the communication with the recording and reproduction device at the time of performing a time shift viewing/listening operation, on a display unit in the display device according to the embodiment of the invention.

FIG. 8 is a diagram illustrating a CEC command format of a channel selection command used in the time shift viewing/listening system according to the embodiment of the invention.

FIG. 9 is a diagram illustrating the CEC command format of a time shift viewing/listening start command used in the time shift viewing/listening system according to the embodiment of the invention.

FIG. 10 is a diagram illustrating the CEC command format of a time shift viewing/listening result notice command used in the time shift viewing/listening system according to the embodiment of the invention.

DESCRIPTION OF REFERENCE MARKS

Figure 1:
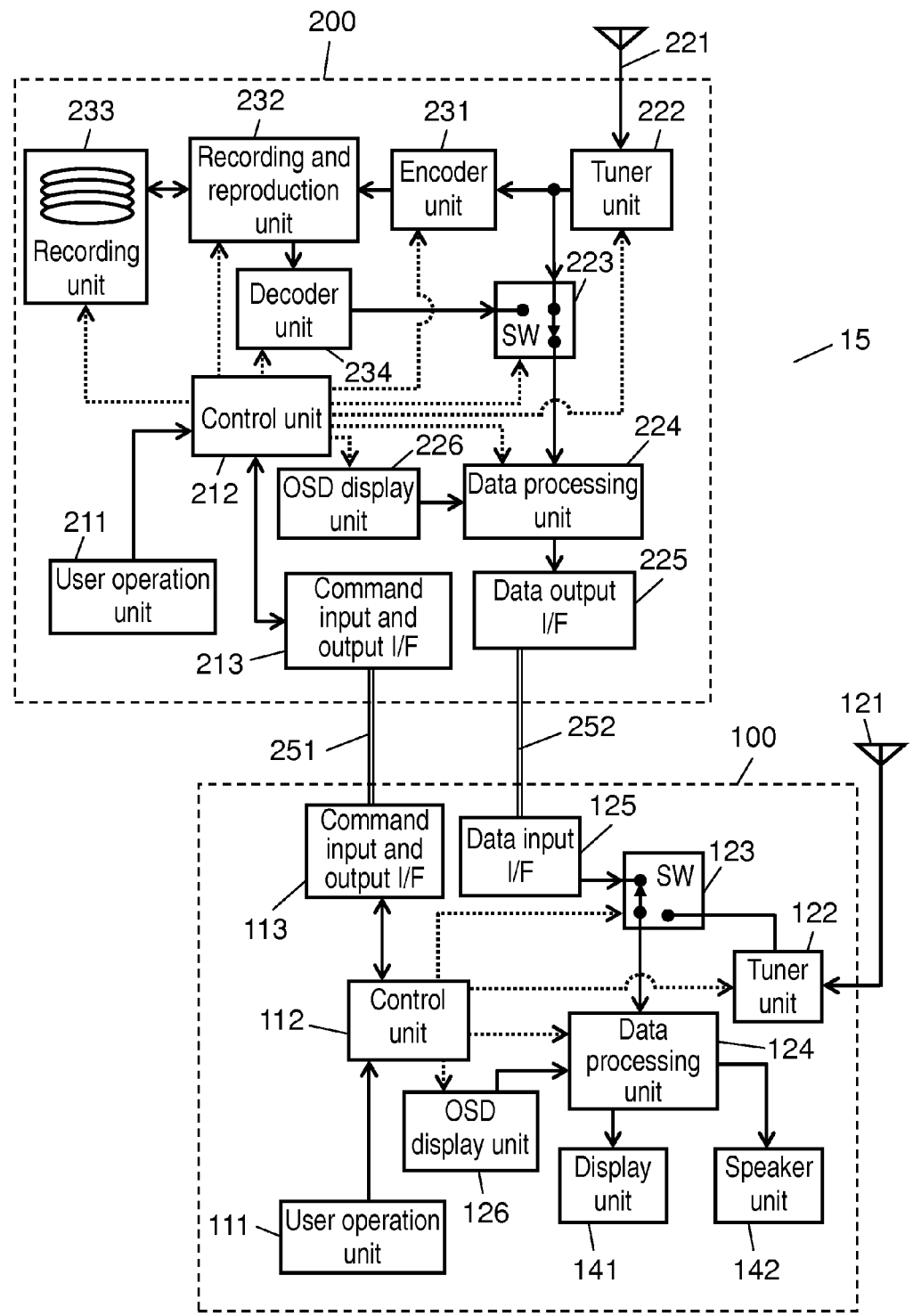
FIG. 1 is a block diagram illustrating the configuration of a time shift viewing/listening system according to an embodiment of the invention.

15 Time shift viewing/listening system
100 Display device
111 User operation unit (Operation input unit)
211 User operation unit
112 Control unit (First control unit)
212 Control unit (Second control unit)
113 Command input and output I/F (First command input and output unit)
213 Command input and output I/F (Second command input and output unit)
121, 221 Antenna
122 Tuner unit (First tuner unit)
222 Tuner unit (Second tuner unit)
123 Switch unit (First input switching unit)
223 Switch unit (Second input switching unit)
124, 224 Data processing unit
125 Data input I/F (Content input unit)
126, 226 OSD display unit
141 Display unit
142 Speaker unit
200 Recording and reproduction device
225 Data input and output I/F
231 Encoder unit (Content output unit)
232 Recording and reproduction unit
233 Recording unit (HDD)
234 Decoder unit
251 Command line
252 Data line
301 Reproduction button (PLAY button)
302, 312 Skip button
303, 313 Stop button
304, 314 Rewinding button
305, 315 Fast winding button
306, 316 EXIT button
311 Pause button (PAUSE button)
330 Remote controller
331 Up button
332 Down button
333 Left button
334 Right button
335 Center button
336 EXIT button
337 Time shift button

PREFERRED EMBODIMENTS FOR CARRYING OUT THE INVENTION

Hereinafter, a preferred embodiment of the invention will be described in detail with reference to the accompanying drawings.

Embodiment

FIG. 1 is a block diagram illustrating the configuration of time shift viewing/listening system 15 according to an embodiment of the invention. In FIG. 1, time shift viewing/ listening system 15 includes display device 100 and recording and reproduction device 200. Display device 100 and recording and reproduction device 200 are connected to each other by command line 251 and data line 252. Command line 251 and data line 252 are disposed in an HDMI cable.

Display device 100 includes antenna 121 receiving broadcast waves, tuner unit 122 as the first tuner unit receiving the broadcast waves output from antenna 121 and outputting contents, user operation unit 111 as the operation input unit inputting a broadcast channel switching instruction and a time shift viewing/listening instruction of the contents received by tuner unit 122, data input I/F (Interface) 125 as the content input unit inputting contents from recording and reproduction device 200, switch unit (hereinafter, referred to as "SW") 123 as the first input switching unit switching an input path of contents between tuner unit 122 and data input I/F 125, display unit 141 displaying the contents input from switch unit 123, command input and output I/F 113 as the first command input and output unit inputting a command from recording and reproduction device 200 and outputting a command to recording and reproduction device 200, data processing unit 124, OSD display unit 126, and speaker unit 142. Display device 100 includes control unit 112 as the first control unit making a control of switching a broadcast channel of the contents received by the first tuner unit based on the broadcast channel switching instruction input from user operation unit 111, a control of outputting a channel selection command including information of the switched broadcast channel from the first command input and output unit, a control of outputting a time shift viewing/listening start command indicating the start of time shift viewing/listening from the first command input and output unit based on the time shift viewing/listening instruction, and a control of switching the input switching unit in response to a video output start command input from the first command input and output unit.

Recording and reproduction device 200 includes antenna 221 receiving broadcast waves, tuner unit 222 as the second tuner unit receiving the broadcast waves from antenna 221 and outputting contents, recording and reproduction unit 232 converting the contents input from tuner unit 222 into recording data and recording and reproducing the recording data, data output I/F 225 as the content output unit outputting the recording data of contents recorded in the recording and reproduction unit 232 to data input I/F 125 as the content s input unit of display device 100, command input and output I/F 213 as the second command input and output unit inputting a command from command input and output I/F 113 as the first command input unit and outputting a command to command input and output I/F 113, user operation unit 211, switch unit 223 as the second input switching unit, data processing unit 224, OSD display unit 226, encoder unit 231, recording unit (HDD) 233, and decoder unit 234.

The recording and reproduction device includes control unit 212 as the second control unit making a control of selecting a channel of tuner unit 222 based on a channel selection command input from command input and output I/F 213, a control of recording and reproducing contents in and from recording and reproduction unit 232 in response to the time shift viewing/listening start command and outputting the contents from data output I/F 225, and a control of outputting an output start notice command, which instructs to the input path of contents in display device 100 from tuner unit 122 to data input I/F 125, from command input and output I/F 213.

Display device 100 such as a television receiver and recording and reproduction device 200 are connected to each other by an HDMI cable. Data input I/F/ 125 and data output I/F 225 are A/V transmission I/F according to the HDMI standard, where video and audio data are transmitted from recording and reproduction device 200 to display device 100 in the format based on the HDMI standard. Command input and output I/F 113 and 213 are CEC (Consumer Electronics Control) I/F according to the HDMI standard, which performs a communication of a control command for operating a device based on the HDMI standard. The HDMI standard supports a CEC vender unique command which can be freely defined by a vender in addition to standard commands. The vender can mount featured functions on his products using the vender unique command.

Operations of display device 100 and recording and reproduction device 200 of time shift viewing/listening system 15 according to the embodiment of the invention will be described in detail with reference to FIG. 1. The operation of recording and reproduction device 200 will be first described.

Data processing unit 224 of recording and reproduction device 200 includes an A/V processor and an HDMI transmitter circuit in this embodiment. Recording unit 233 is an HDD and can perform a recording operation and a reproduction operation simultaneously. Recording unit 233 may be combined and mounted with a removable medium such as a DVD-RAM, a BD-RE (Blu-ray Disc Rewritable), a semiconductor memory. Encoder unit 231 performs a process of converting digital video and audio streams input from tuner unit 222 into a data format which is recordable in recording unit 233, such as a format of a DVD-Video standard format or a MPEG4-AVC standard format. Recording and reproduction unit 232 performs a recording process of recording the video and audio data input from encoder unit 231 in recording unit 233 and a reproduction process of outputting the video and audio data reproduced from the recording unit 233 to decoder unit 234.

Decoder unit 234 decodes the recorded contents read from the recording unit 233 via recording and reproduction unit 232, reproduces the contents from an arbitrary start position, and outputs the reproduced contents as a digital video and audio stream. OSD display unit 226 prepares a reproducing operation panel for the time shift viewing/listening at the time of starting the reproduction of a still image when the time shift viewing/listening start command is received from display device 100. Data processing unit 224 can display the integrated picture of reproducing operation panel overlapped with the reproduced contents decoded by decoder unit 234 on the same screen.

Control unit 212 transmits a menu-operable notice command, in addition to an output start notice command defined by the HDMI standard, to display device 100 via command input and output I/F 213 at the time of starting the reproduction of the still image for the time shift viewing/listening. Thereafter, the control unit receives a remote controller operation of display device 100 and controls the reproducing operation panel. In the reproducing operation panel, operation buttons corresponding to those of the remote controller of display device 100 are displayed on a screen and key codes corresponding to user-operating push commands defined in the HDMI standard and reproducing operation details performed by control unit 212 are allocated to the buttons. For example, user-operating push CEC commands of left, right, up, down, center, and cancel buttons of the remote controller correspond to a left command, a right command, an up command, a down command, an enter command, and an exit command and also correspond to reproduction operations of rewinding, fast winding, skip, stop, pause/play, and reproducing operation panel erasing. The reproducing operation panel will be described in detail later with reference to FIG. 2.

Tuner unit 222 has a channel selection function of selecting a broadcast program to be recorded by recording and reproduction device 200. Display device 100 can remotely control tuner unit 222 via command input and output I/F 213 using a channel selection command defined by the CEC vender unique command. That is, whenever tuner unit 222 of recording and reproduction device 200 is selected, control unit 112 of display device 100 transmits the channel selection command to recording and reproduction device 200. Information included in the channel selection command includes the type of a transmission path such as ground, cable, and satellite, a transmission frequency, transmission data such as physical channel number, transport stream ID, service ID, and original network ID in digital broadcast, and broadcast type such as NTSC, PAL, and SECAM in analog broadcast, in addition to a general channel number.

As described above, the first control unit may make a control of outputting the channel selection command including the information of the broadcast channel of the contents, which are being received by the first tuner unit, from the first command input and output unit at the time of outputting a time shift viewing/listening start command.

Recording and reproduction device 200 receives the channel selection command received from display device 100 via command input and output I/F 213 in a recording standby state, that is, in a state where a recording operation can be started at once in response to a user's operation even when the power source is in a standby state. Recording and reproduction device 200 makes a channel selection control of tuner unit 222 built therein and performs a process of converting the contents from tuner unit 222 into a recording data format, which can be recorded by recording unit 233, by the use of encoder unit 231.

The operation of display device 100 will be described below. In this embodiment, data processing unit 124 includes, for example, a HDMI receiver circuit. OSD display unit 126 displays a time shift viewing/listening start GUI (Graphical User Interface). The GUI can be displayed integrally by an image processor so as to be overlapped with the reproduced content of recording and reproduction device 200 on the same screen. User operation unit 111 is a front panel or an infrared remote controller. The input switching or the GUI operation can be performed using user operation unit 111. A user can carry out the same operation as the time shift viewing/listening start GUI by pressing a time shift viewing/listening start button of the infrared remote controller. Control unit 112 controls the units. Particularly, the channel selection control of tuner unit 122 built in display device 100, the input and output switching control of switching input and output paths of A/V data by the use of switch unit 123, and a control of transmitting and receiving CEC commands via command input and output I/F 113 are performed.

Tuner unit 122 can receive ground digital broadcast and can select the same broadcast channel as tuner unit 222 based on the same broadcast standard. When digital broadcast waves are being received, the output video and audio signal is converted from an elementary stream based on the MPEG2 standard into a digital video stream which is encoded in a color space of YUV422 and a digital audio stream which is encoded in PCM or AAC by a decoder unit not shown. When analog broadcast waves are being received, the output video and audio signal is converted into a digital video stream and a digital audio stream by an A/D converter unit not shown.

When the menu-operable notice command defined in the HDMI standard is received from recording and reproduction device 200 via command input and output I/F 113, display device 100 allocates the input, which is made to user operation unit 111 from a user, to the key codes of user-operating push commands defined in the HDMI standard in the remote controller of display device 100, and transmits the key codes to recording and reproduction device 200. As a result, display device 100 can remotely operate recording and reproduction device 200.

Figure 2A:
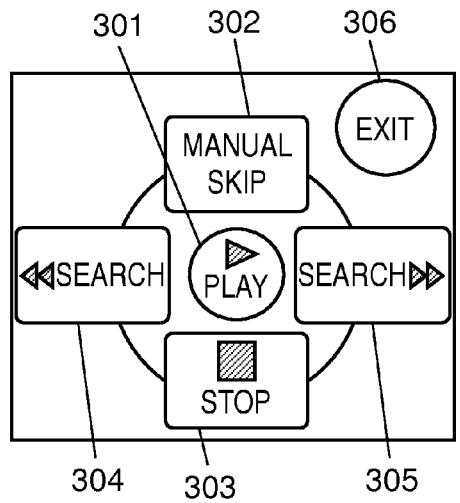
FIG. 2A is a diagram illustrating a reproducing operation panel which is displayed on a screen of a display device by a recording and producing device of the time shift viewing/listening system according to the embodiment of the invention in the course of pausing a program.
Figure 2B:
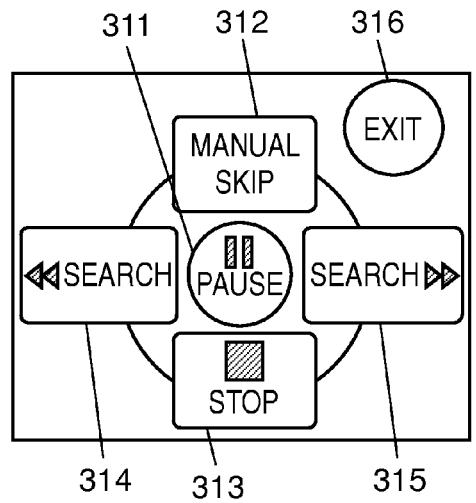
FIG. 2B is a diagram illustrating a reproducing operation panel which is displayed on the screen of the display device by the recording and producing device of the time shift viewing/listening system according to the embodiment of the invention in the course of reproducing a program in a time shift manner.
Figure 2C:
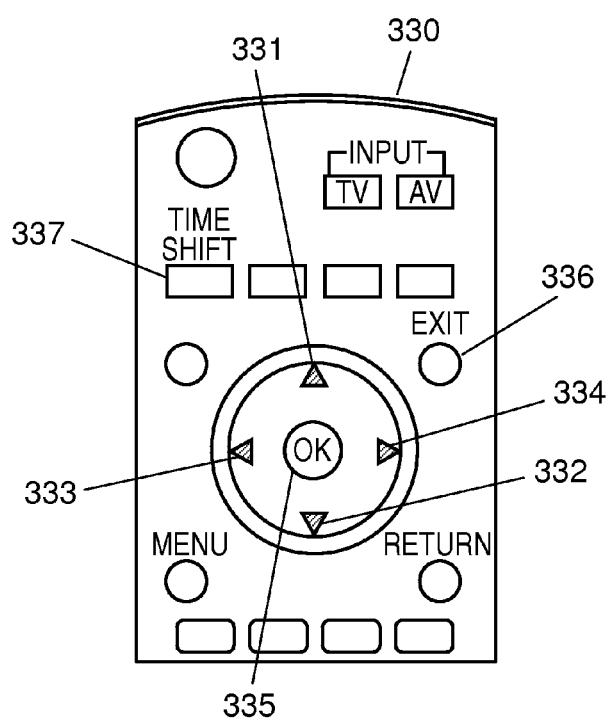
FIG. 2C is a diagram illustrating an example (part) of a remote controller of the display device corresponding to the reproducing operation panel in the time shift viewing/listening system according to the embodiment of the invention.

FIGS. 2A, 2B, and 2C are diagrams illustrating the operation buttons of the remote controller and the operation panels of time shift viewing/listening system 15 according to the embodiment of the invention. FIG. 2A is a diagram illustrating a reproducing operation panel displayed on the screen of display device 100 when recording and reproduction device 200 is pausing a program. FIG. 2B is a diagram illustrating the reproducing operation panel displayed on the screen of display device 100 when recording and reproduction device 200 is performing time shift viewing/listening reproduction. FIG. 2C is a diagram illustrating an example (part) of the remote controller of display device 100 corresponding to the reproducing operation panel.

As shown in FIG. 2A, the reproducing operation panel in the course of pausing a program includes reproduction button 301, skip button 302, stop button 303, rewinding button 304, fast winding button 305, and exit button 306. As shown in FIG. 2B, the reproducing operation panel in the course of reproducing a program includes pause button 311, skip button 312, stop button 313, rewinding button 314, fast winding button 315, and exit button 316. As shown in FIG. 2C, remote controller 330 of display device 100 includes left button 333, right button 334, up button 331, down button 332, center button 335, exit button 336, and time shift button 337 for time shift viewing/listening. The key codes corresponding to the user-operating push command defined in the HDMI standard and reproduction details performed by controller 212 are allocated to six buttons of from left button 333 to exit button 336. That is, user-operating push CEC commands of left command, right command, up command, down command, enter command, and exit command are allocated to six buttons of from left button 333 to exit button 336, and the buttons correspond to reproduction operations of rewinding, fast winding, skip, stop, pause/reproduction, and reproducing operation panel erasing at the time of pausing a program and performing a reproduction operation.

Figure 3:
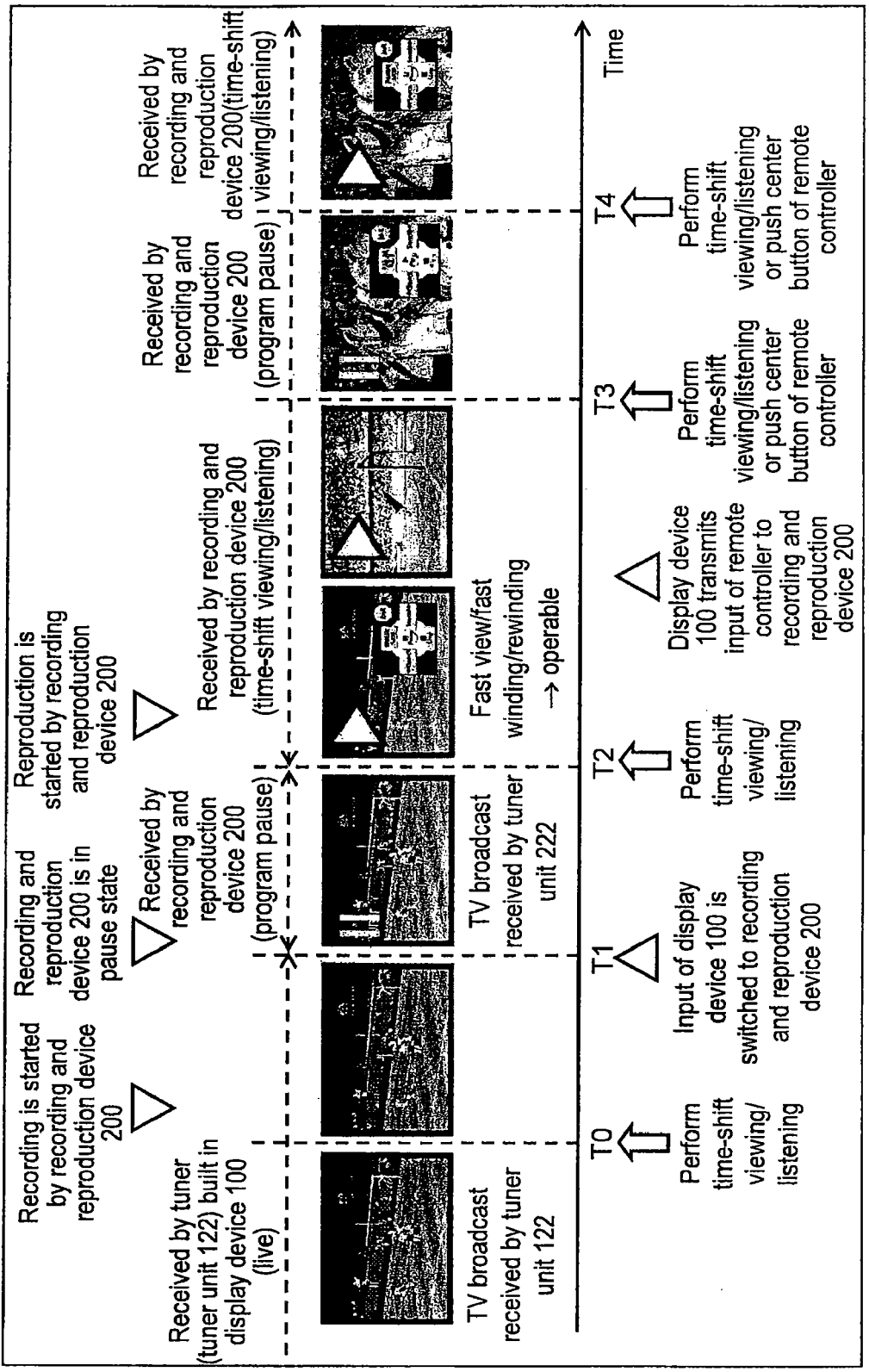
FIG. 3 is a diagram illustrating examples where a picture displayed on a display unit is changed when the time shift viewing/listening is carried out or the center button of the remote controller is pressed in the display device according to the embodiment of the invention.
Figure 4:
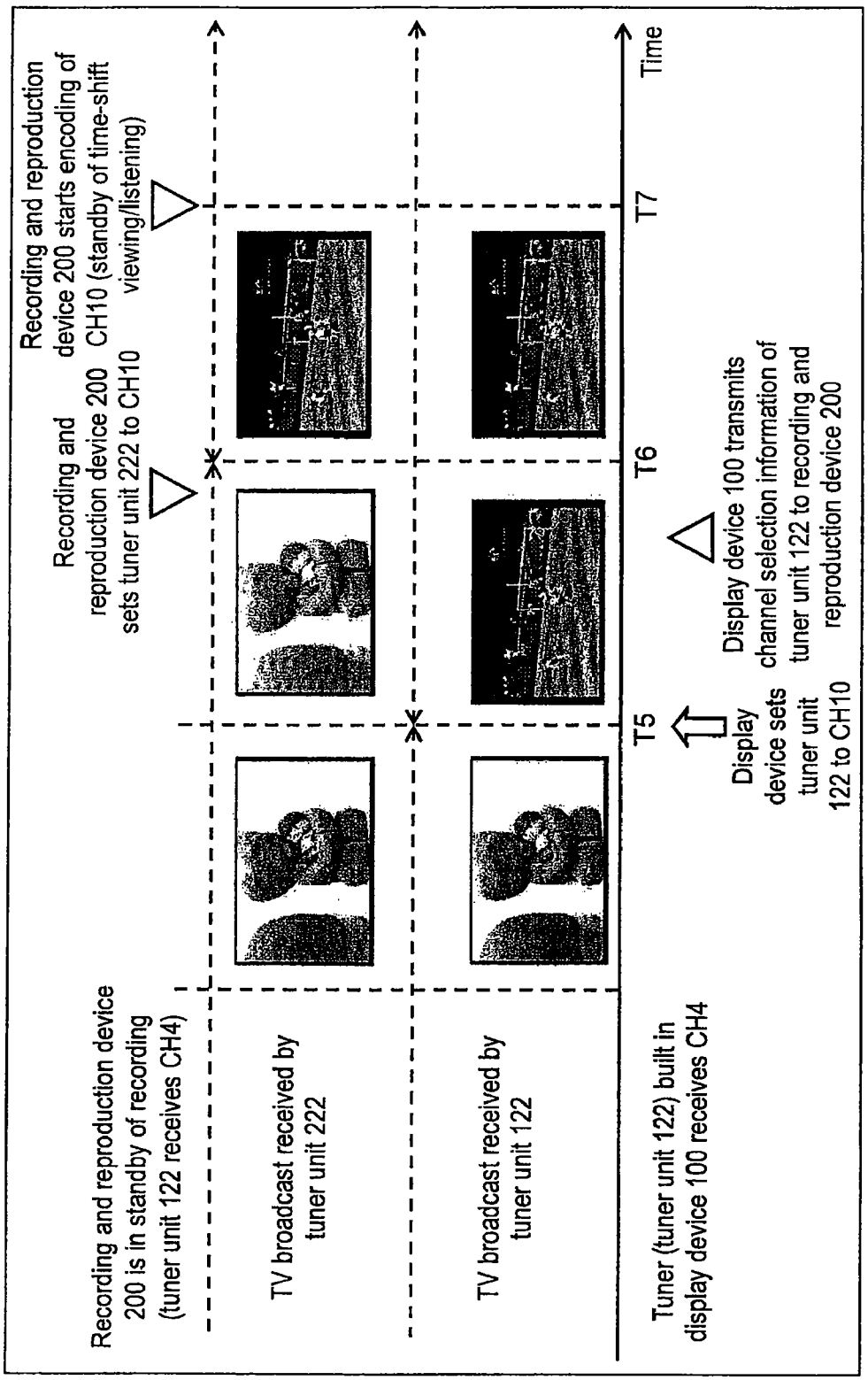
FIG. 4 is a diagram illustrating examples where a picture is changed when a channel other than a channel in reception is selected in the course of viewing/listening broadcast by the use of a tuner unit built in the display device in the display device according to the embodiment of the invention.

FIG. 3 is a diagram illustrating examples where a picture displayed on display unit 141 is changed when the time shift viewing/listening operation is carried out or center button 335 of remote controller 330 is pressed in display device 100 according to the embodiment of the invention. FIG. 4 is a diagram illustrating examples where a picture is changed when a channel other than a channel in reception is selected in the course of viewing/listening broadcast by the use of tuner unit 122 built in display device 100, in display device 100 according to the embodiment of the invention. In the following description, it is assumed that the time shift viewing/listening operation is carried out by pushing time shift button 337 shown in FIG. 2C.

FIG. 3 shows examples where a picture displayed on display unit 141 of display device 100 is changed. In FIG. 3, the horizontal axis represents time. The drawing shows, for example, when the time shift viewing/listening operation is performed in the course of receiving live broadcast, when the time shift viewing/listening operation is performed in the course of pausing a program, when center button 335 of remote controller 330 is pushed in the course of pausing a program, when up button 331, down button 332, left button 333, or right button 334 of remote controller 330 is pushed in the course of performing the time shift reproduction, when the time shift viewing/listening operation is performed in the course of performing the time shift reproduction, and when center button 335 of remote controller 330 is operated in the course of performing the time shift reproduction.

Relations among the user's operation, the operations of recording and reproduction device 200 and display device 100, display pictures of display device 100 thereof in time shift viewing/listening system 15 according to the embodiment of the invention will be described with reference to FIG. 3. When the user performs the time shift viewing/listening operation at time T0, for example, due to a visitor in the course of receiving (live) television broadcast by the use of tuner unit 122 built in display device 100, recording and reproduction device 200 starts a recording operation. Thereafter, control unit 112 of display device 100 displays the output video from recording and reproduction device 200 on display unit 141 of display device 100 by controlling switch unit 123 to switch the input from tuner unit 122 to data input I/F 125 at time T1. Almost at the same time, recording and reproduction device 200 stops the reproduced video of a video content recorded in recording unit 233 in a pause state and the paused image is displayed on display unit 141 of display device 100. In this way, the program pausing state means a state where the function of pausing the reproduced video of the vide content and displaying the paused image on display unit 141 is being performed. Thereafter, when the visitor gets out and the user performs the time shift viewing/listening operation again at time T2, recording and reproduction device 200 starts the reproduction of the video content recorded in recording unit 233 and displays the reproducing operation panel shown in FIG. 2B on display unit 141 so as to overlap with the reproduced video.

As described above, control unit 212 of recording and reproduction device 200 makes a control of releasing the stop and starting the reproduction when the time shift viewing/listening start command is input to the second command input and output unit in the course of pausing the reproduction of data recorded by recording and reproduction unit 232. The user can perform operations of normal reproduction (1× reproduction), fast winding, rewinding, skip, and stop by pushing the operation buttons of remote controller 330 corresponding to the operation buttons of the reproducing operation panel. For example, the live video in reception may be caught up with by performing the fast winding operation. That is, in time shift viewing/listening system 15 according to this embodiment in time shift viewing/listening, display device 100 transmits an operation instruction input to the operation input unit to recording and reproduction device 200. Recording and reproduction device 200 performs at least one operation of still image release (reproduction start), fast winding, and rewinding based on the operation instruction.

When the user performs the time shift viewing/listening operation again or pushes center button 335 (corresponding to the "pause" button of the reproduction operation panel) of remote controller 330 at time T3, recording and reproduction device 200 stops the video in the pause state and displays the reproduction operation panel shown in FIG. 2A on display unit 141 to overlap with the still image. In this case, recording and reproduction device 200 continuously records the television broadcast received by tuner unit 222. In this state, when the user performs the time shift viewing/listening operation again or pushes center button 335 (corresponding to the "play" button of the reproduction operation panel) of remote controller 330 at time T4, a reproduction mode is performed from the stop position in the pause state and the time shift viewing/listening is started.

The changes of the picture displayed on display unit 141 of display device 100 will be described with reference to FIG. 4 where a channel other than the channel in reception is selected in the course of viewing/listening broadcast by the use of tuner unit 122 built in display device 100 in time shift viewing/listening system 15 according to the embodiment of the invention. First, it is assumed that display device 100 and recording and reproduction device 200 are receiving television broadcast of the same channel (CH4) by the use of tuner unit 122 and tuner unit 222, respectively. At this time, recording and reproduction device 200 stands by the recording.

At time T5, control unit 112 of display device 100 sets tuner unit 122 to CH10 based on an instruction from user operation unit 111. Thereafter, control unit 112 of display device 100 transmits channel selection information of tuner unit 122 to control unit 212 of recording and reproduction device 200 via command input and output I/F 113 and 213. Control unit 212 of recording and reproduction device 200 having received the channel selection information sets tuner unit 222 to CH10. At time T6, the television broadcast received by tuner unit 222 of recording and reproduction device 200 is switched to CH10.

Thereafter, at time T7, control unit 212 of recording and reproduction device 200 starts encoding video and audio signals of CH10 by the use of encoder unit 231 and stands by the time shift viewing/listening. In this way, whenever the channel setting in display device 100 is changed, the setting of tuner unit 222 of recording and reproduction device 200 may be accordingly changed and the encoding process necessary for the recording operation may be finished in advance. As a result, even when the user pushes time shift button 337 of remote controller 330 at any time to start the time shift viewing/listening, it is possible to satisfactorily record video and audio just after time shift button 337 is pushed.

Figure 5:
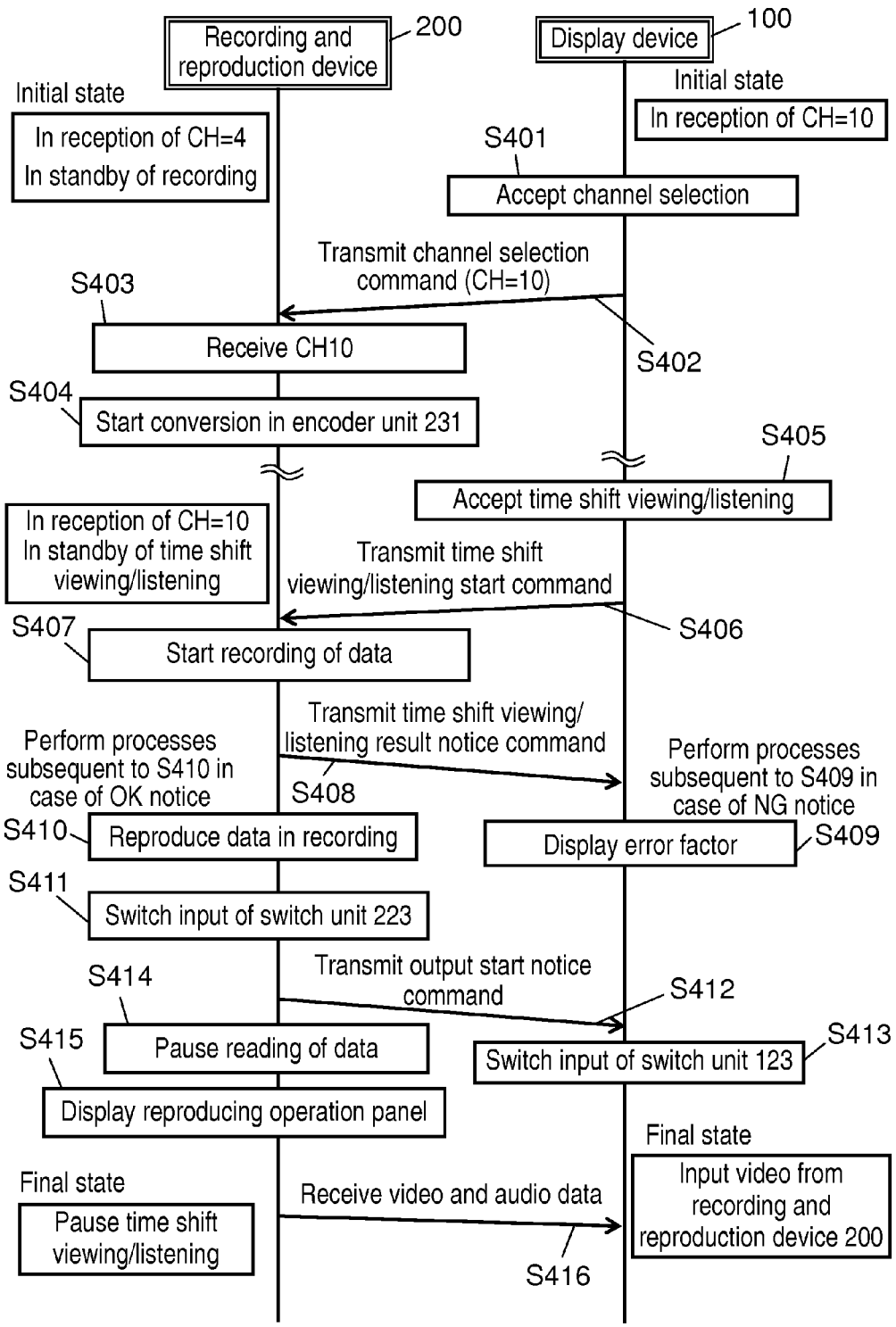
FIG. 5 is a flow diagram illustrating a communication sequence of operations of the display device and the recording and reproduction device when a channel other than the channel being currently received by the recording and reproduction device is selected in the course of viewing/listening broadcast by the use of the tuner unit built in the display device and when the time shift viewing/listening operation is performed in the course of receiving live broadcast in the display device according to the embodiment of the invention.

A time shift viewing/listening method in time shift viewing/listening system 15 including display device 100 having the first tuner unit and recording and reproduction device 200 having the second tuner unit and being connected to display device 100 according to the embodiment of the invention will be described in detail. FIG. 5 is a flow diagram illustrating a communication sequence of operations of display device 100 and recording and reproduction device 200 when a channel other than the channel being currently received by recording and reproduction device 200 is selected in the course of viewing/listening the broadcast by the use of tuner unit 122 built in display device 100 and when the time shift viewing/listening operation is performed in the course of receiving the live broadcast in display device 100 according to the embodiment of the invention.

First, the operations will be described when a channel other than the channel being currently received by recording and reproduction device 200 selects is selected in the course of viewing/listening the broadcast of CH10 by the use of tuner unit 122 built in display device 100 in the initial state. Here, it is assumed as the initial state that recording and reproduction device 200 sets the input of switch unit 223 to tuner unit 222, receives the television broadcast of CH4 by the use of tuner unit 222, and stands by the recording. The statement that recording and reproduction device 200 stands by the recording means a state where a main power source of recording and reproduction device 200 is turned off but a standby power source of recording and reproduction device 200 is turned on. In this state, recording and reproduction device 200 cannot record or reproduce contents, but is supplied with minimum power for changing the channel setting of tuner unit 222 in response to an instruction from the user.

In FIG. 5, control unit 112 of display device 100 accepts the selection of CH10 via user operation unit 111 from the user (step S401). Control unit 112 transmits the channel selection command (CH=10) to recording and reproduction device 200 and control unit 212 receives the channel selection command (CH=10) (step S402). Control unit 212 sets the channel of tuner unit 222 to CH10 and receives CH10 (step S403). Control unit 212 instructs encoder unit 231 to start the conversion of output data of tuner unit 222 (step S404). In this state, display device 100 sets the input of switch unit 123 to tuner unit 122 and sets the channel to CH10. That is, display device 100 receives and displays CH10. Recording and reproduction device 200 sets the input of switch unit 223 to tuner unit 222 and stand by the recording with the channel set to CH10.

Operations will be described when the time shift viewing/listening start operation is accepted by the input to user operation unit 111 in the course of receiving broadcast by the use of tuner unit 122 of display device 100. When the time shift viewing/listening start operation is accepted (step S405), control unit 112 transmits the time shift viewing/listening start command to recording and reproduction device 200 (step S406). Then, control unit 212 receives the time shift viewing/listening start command. Control unit 212 instructs recording and reproduction unit 232 to record data based on the reception result, whereby the recording of data is started (step S407). Control unit 212 transmits a time shift viewing/listening result notice command to display device 100 based on the time shift viewing/listening result acquired from recording and reproduction unit 232 (step S408). Here, the time shift viewing/listening result notice acquired based on the time shift viewing/listening result notice command includes an OK notice and an NG notice. The OK notice is transmitted when the time shift viewing/listening can be normally carried out. On the other hand, the NG notice is transmitted when the time shift viewing/listening cannot be normally carried out. When the time shift viewing/listening result notice is the OK notice, the control step of recording and reproduction device 200 goes to the step subsequent to step S410.

On the other hand, when the time shift viewing/listening result notice is the NG notice, an error factor in recording in recording and reproduction device 200, which is given as a parameter value of the time shift viewing/listening result notice command, is determined by display device 100. Display device 100 reads a corresponding text pattern (which is shown in FIG. 7) stored in a memory not shown, sends the error factor to OSD display unit 126 (step S409), and ends the flow. When the time shift viewing/listening result notice is the OK notice, the OSD display is not made.

In step S410, control unit 212 reads and reproduces the data in recording from the head from recording unit 233. Control unit 212 switches the input of switch unit 223 to decoder unit 234 (step S411). Control unit 212 broadcasts an output start notice command from command input and output I/F 123 and control unit 112 receives the output start notice command from command input and output I/F 113 (step S412). When the output start notice command is received, control unit 112 switches the input of switch unit 123 to data input I/F 125 (step S413). Control unit 212 instructs recording and reproduction unit 232 to pause the reproduction of data, and pauses the reading of data into a stop state (step S414). Control unit 212 displays the reproducing operation panel (in which the display corresponding to center button 335 is "PLAY" indicating a state where data can be reproduced by a next operation in FIG. 2A) which is paused on OSD display unit 226 (step S415 which corresponds to time T2 in FIG. 3). Control unit 212 instructs data processing unit 224 to transmit the video and audio data and the data processing unit 124 receives the data (step S416).

By this series of processes, in the final state, display device 100 sets the channel of tuner unit 122 to CH10 but has the video input from recording and reproduction device 200 via data input I/F 125. Similarly, recording and reproduction device 200 outputs the video recorded in recording unit 233 at CH10 to display device 100 from decoder unit 234 by the channel setting of tuner unit 222. At this time, the time shift viewing/listening operation is in pause state.

The processes of steps S413 and S416 performed by display device 100 are performed at the same time as the processes of steps S414 to S416 performed by recording and reproduction device 200. In the meantime, although not shown in the flow diagram, control unit 112 controls data processing unit 124 to perform an authentication process and a video and audio process based on the HDMI standard, controls display unit 141 to output the video, and controls speaker unit 142 to output the audio.

As described above, the time shift viewing/listening method in time shift viewing/listening system 15 including display device 100 having the first tuner unit and recording and reproduction device 200 having the second tuner unit and being connected to display device 100 according to the embodiment of the invention includes the following steps. That is, the time shift viewing/listening method includes a step of causing display device 100 to make a control of switching a broadcast channel of a content received by the first tuner unit based on a broadcast channel switching instruction and to transmit a channel selection command including information of the switched broadcast channel to recording and reproduction device 200; and a step of causing recording and reproduction device 200 having received the channel selection command to select a channel of the second tuner unit based on the channel selection command. The time shift viewing/listening method further includes a step of causing display device 100 to transmit a time shift viewing/listening start command indicating a start of time shift viewing/listening to recording and reproduction device 200 based on the time shift viewing/listening instruction; a step of causing recording and reproduction device 200 having received the time shift viewing/listening start command to record and reproduce a content, to output the content to display device 100, and to transmit an output start notice command to display device 100; and a step of causing display device 100 having received the output start notice command to switch an input path of a content from the first tuner unit to recording and reproduction device 200.

The step of causing display device 100 to transmit the time shift viewing/listening start command to recording and reproduction device 200 includes transmitting a channel selection command including information of the broadcast channel of the content which is being received by the first tuner unit.

Figure 6:
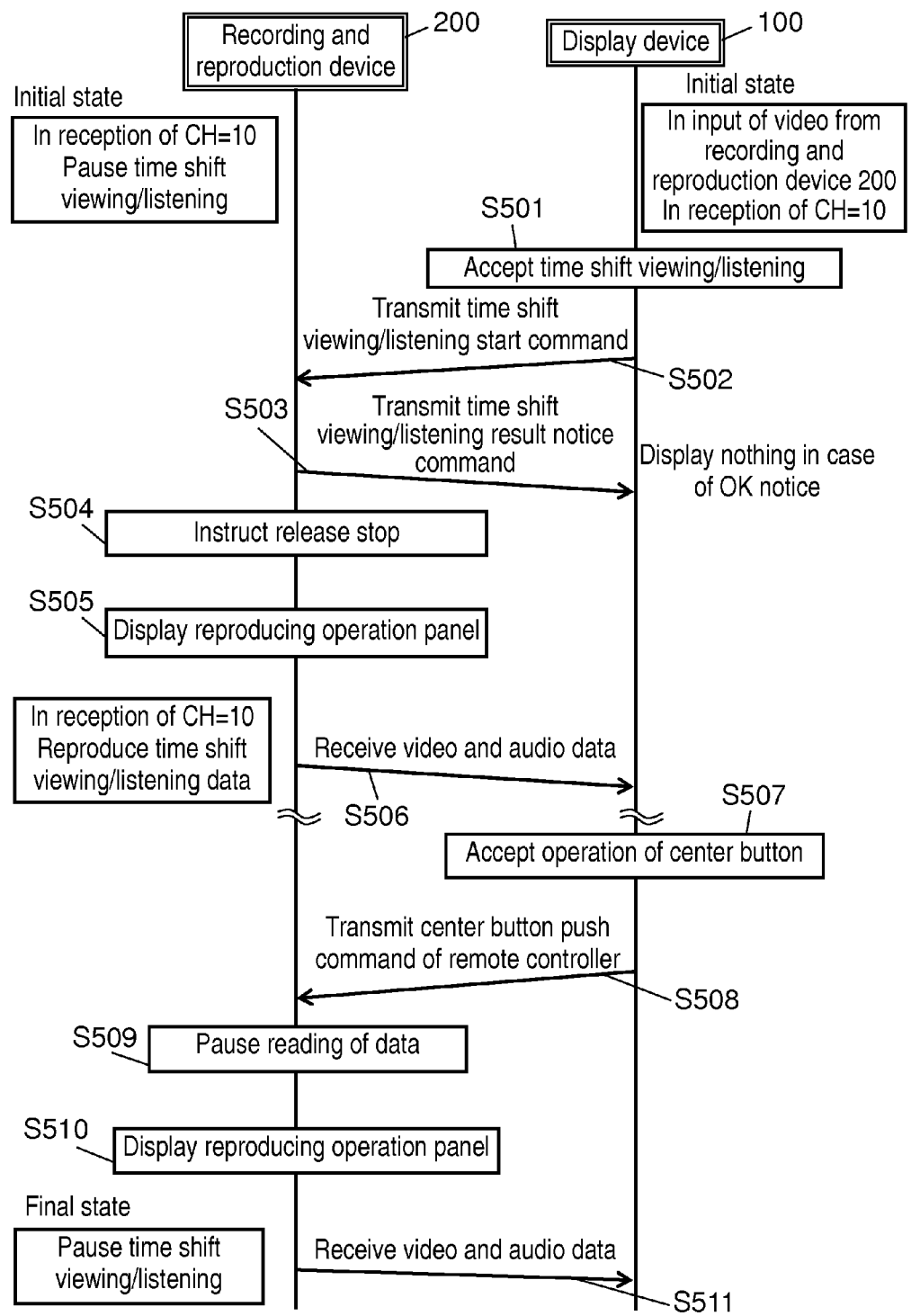
FIG. 6 is a flow diagram illustrating a communication sequence of operations of the display device and the recording and reproduction device when the time shift viewing/listening operation is performed in the course of pausing a program and when the center button of the remote controller is operated in the course of reproducing a program in a time shift manner in the display device according to the embodiment of the invention.

FIG. 6 is a flow diagram illustrating a communication sequence of operations of display device 100 and recording and reproduction device 200 when the time shift viewing/listening operation is performed in the course of pausing a program and when the center button of the remote controller is operated in the course of reproducing a program in a time shift manner in the display device according to the embodiment of the invention.

In an initial state, display device 100 sets the channel of tuner unit 122 to CH10 but has a video input from recording and reproduction device 200 via data input I/F 125. Recording and reproduction device 200 sets the channel of tuner unit 222 to CH10 and outputs the video recorded in recording unit 233 to display device 100 from decoder unit 234. The operation of the time shift viewing/listening system in this case will be described when various operations of the remote controller are input from display device 100 in the course of pausing the time shift viewing/listening program.

Display device 100 accepts the time shift viewing/listening start operation again (step S501) by the input to user operation unit 111 in the course of displaying a time shift viewing/listening still picture and reproduction device 200. Based on this acceptance, control unit 112 transmits the time shift viewing/listening start command to recording and reproduction device 200 from command input and output I/F 113 and control unit 212 receives the command from command input and output I/F 213 (step S502). Control unit 212 transmits the time shift viewing/listening result notice command (OK notice) to display device 100 from command input and output I/F 213 and control unit 112 receives the command from command input and output I/F 113 (step S503). Since the received time shift viewing/listening result notice is the OK notice, control unit 112 does not display any thing on OSD display unit 126.

Control unit 212 instructs recording and reproduction unit 232 of recording unit 233 to restart, stop, and release the reading of data (step S504). Control unit 212 displays the reproducing operation panel (in which the display corresponding to center button 335 is the "PAUSE" indicating a state where data can be stopped by a next operation in FIG. 2B) on OSD display unit 226 (step S505). Control unit 212 instructs data processing unit 224 to transmit the video and audio data and data processing unit 124 receives the data (step S506).

Accordingly, the final state of time shift viewing/listening system 15 is as follows. Display device 100 sets the channel of tuner unit 122 to CH10 but has a video input from recording and reproduction device 200 via data input I/F 125. Recording and reproduction device 200 sets the channel of tuner unit 222 to CH10 and outputs the video recorded in recording unit 233 to display device 100 from decoder unit 234. At this time, the time shift (reproduction) is started.

When display device 100 accepts the operation of center button 335 of remote controller 330 by the input to user operation unit 111 in the course of displaying the picture for the time shift viewing/listening from recording and reproduction device 200 (step S507), control unit 112 transmits a user-operating press "ENTER" command to recording and reproduction device 200 from command input and output I/F 113 and control unit 212 receives the command from command input and output I/F 213 (step S508). Control unit 212 instructs recording and reproduction unit 232 to pause the reproduction into the stopped state (step S509). That is, control unit 212 makes a control of pausing the reproduction and displaying a still image, when the time shift viewing/listening start command is input to the second command input and output unit in the course of reproducing data recorded by recording and reproduction unit 232.

Thereafter, control unit 212 displays the reproducing operation panel (in which the display corresponding to center button 335 is the "PLAY" indicating a state where data can be reproduced by a next operation in FIG. 2A) in pause on OSD display unit 226 (step S510). Control unit 212 instructs data processing unit 224 to transmit the video and audio data from data output I/F 225 and first data processing unit 124 receives the data from data input I/F 125 (step S511).

As a result, in the final state where the time shift viewing/listening operation is in pause state in time shift viewing/listening system 15, display device 100 sets the channel of tuner unit 122 to CH10, but has a video input from recording and reproduction device 200 via data input I/F 125. Recording and reproduction device 200 sets the channel of tuner unit 222 to CH10 and outputs the video recorded in recording unit 233 to display device 100 from decoder unit 234. On the other hand, in the final state where the time shift viewing/listening reproduction is performed, display device 100 sets the channel of tuner unit 122 to CH10, but has a video input from recording and reproduction device 200 via data input I/F 125. Recording and reproduction device 200 sets the channel of tuner unit 222 to CH10 and outputs the video recorded in recording unit 233 to display device 100 from decoder unit 234.

Here, the flow subsequent to step S509 is the same as the flow of steps S413 to S416. The operation when the operation of center button 335 of remote controller 330 is accepted in pause state is the same as the flow of steps S504 to S506 and is not described. The operation when the time shift viewing/listening start operation is accepted in reproduction state is the same as the flow of steps S509 to S511 subsequent to the flow of steps S501 to S503 and is not thus described. In time shift viewing/listening system 15, display device 100 can transmit a command defined as one to one with respect to the user's operation input and need not to know the operation state of recording and reproduction device 200.

The above-mentioned operations of time shift viewing/listening system 15 can be embodied by transmitting and receiving the standard commands based on the HDMI standard or the vender-unique commands between display device 100 and recording and reproduction device 200. Accordingly, the user can operate time shift viewing/listening system 15 using only remote controller 330 of display device 100. Accordingly, since remote controller 330 need not be changed every operation for the time shift viewing/listening, it is possible to greatly improve the operability and the response.

It has been described that when the channel setting of tuner unit 122 of display device 100 is switched, the channel setting is transmitted to recording and reproduction device 200 and the same channel is set in tuner unit 222 of recording and reproduction device 200, thereby enabling the time shift viewing/listening. The setting information of tuner unit 122 may include audio switching information or caption switching information set in the content being received by tuner unit 122, as well as the channel setting information. This information may be transmitted to recording and reproduction device 200 from display device 100. The audio switching information or the caption switching information is information necessary for reproducing the video and audio data from recording and reproduction device 200 at the time of performing the time shift viewing/listening operation. Accordingly, it is not necessary to transmit the information at the timing of switching the channel of display device 100, unlike the channel setting, and the information can be transmitted together at the time of transmitting the time shift viewing/listening start command in step S406 of FIG. 5.

That is, when outputting the time shift viewing/listening start command, the first control unit may make a control of outputting the audio switching information or the caption switching information set in the content being received by the first tuner unit from the first command input and output unit.

For example, the audio switching setting information of display device 100, that is, the setting information indicating whether the audio is Japanese or English or primary audio or secondary audio, is transmitted to recording and reproduction device 200 along with the time shift viewing/listening start command, and recording and reproduction device 200 stores the setting information in a memory unit (not shown). Recording and reproduction device 200 reads the stored setting information at the time of performing the time shift viewing/listening and switches the audio signal of the content reproduced from recording and reproduction device 200 based on the setting information. Accordingly, out of plural audio signals included in the broadcast content being received by tuner unit 122 of display device 100, the same audio signal as selected by display device 100 is output to display device 100 from recording and reproduction device 200. Accordingly, the audio signal selected by the user's operation in the course of viewing/listening the content can be continuously reproduced during the time shift viewing/listening.

Similarly to the audio switching setting information, the caption switching setting information, that is, the setting information indicating whether the caption is turned on or off, or Japanese or English, is transmitted to recording and reproduction device 200 along with the time shift viewing/listening start command, and recording and reproduction device 200 stores the setting information in the memory unit (not shown). Recording and reproduction device 200 reads the stored setting information at the time of performing the time shift viewing/listening and switches the caption signal of the content reproduced from recording and reproduction device 200 based on the setting information. Accordingly, out of plural caption signals included in the broadcast content being received by tuner unit 122 of display device 100, the same caption signal as selected by display device 100 is output to display device 100 from recording and reproduction device 200. Accordingly, the caption signal selected by the user's operation in the course of viewing/listening the content can be continuously reproduced during the time shift viewing/listening.

As described above, the setting information can be transmitted at the same time as transmitting the time shift viewing/listening start command from display device 100 to recording and reproduction device 200 in step S406 of FIG. 5, and any particular process is not necessary.

When the notice result in step S409 of FIG. 5 or step S503 of FIG. 6 is the NG notice, the display details displayed on OSD display unit 226 will be described. FIG. 7 is a diagram illustrating a text message for displaying error factors, which are acquired by the communication with recording and reproduction device 200 at the time of performing the time shift viewing/listening operation, on the display unit in display device 100 according to the embodiment of the invention.

Control unit 212 outputs the error factor of non-recordable from command input and output I/F 213 when determining that data is non-recordable by recording and reproduction unit 232, and control unit 112 analyzes the error factor of non-recordable input from command input and output I/F 113 and displays the analysis result on the screen. The operation of control unit 112 of displaying the analysis result on the screen will be described below.

First, the error factors will be described. The error factors acquired by the communication with recording and reproduction device 200 at the time of performing the time shift viewing/listening operation are various and an example thereof is shown in FIG. 7. The error factors can be roughly classified into (1) factors based on the broadcast program, (2) factors based on the operation state of recording and reproduction device 200, (3) factors based on a recording medium, and (4) factors based on the setting of recording and reproduction device 200.

Examples of (1) include time shift viewing/listening program non-selectable, viewing/listening-restricted, signal not transmitted, and broadcast type not coped with by display device 100 or recording and reproduction device 200. In this case, for example, a message of "specified broadcast cannot be recorded" is displayed. As for broadcast programs of which copy is inhibited or of which the number of copies is excessive, for example, a message of "broadcast non-recordable for protecting copy right" is displayed.

In examples of (2), a message of "non-recordable because it is in reproduction" is displayed when a content recorded by the recording unit is being reproduced, and a message of "non-recordable because it is in recording" is displayed when the timer recorded program is being recorded.

In examples of (3), a case where the remaining capacity of a medium is not sufficient, a case where the medium is inhibited from writing, and a case where data is non-recordable due to a problem with the medium can be considered. For example, when the remaining capacity of a medium is not sufficient, a message of "Non-recordable. Please check the remaining capacity of the medium." can be displayed.

An example of (4) includes a case where recording and reproduction device 200 is set to inhibit the recording thereto. In this case, a message of "Non-recordable. Please check the setting of the recording and reproduction device" can be displayed.

In this way, when the time shift viewing/listening fails, it is possible to improve the operational response by displaying the error factor on the screen of display device 100 and omitting the process of switching the input from display device 100 to recording and reproduction device 200. By notifying the user of the reason of the failure of the time shift viewing/listening, it is possible to prevent the user from misunderstanding that a broadcast program is recorded. It is also possible to rapidly perform countermeasures of re-setting the state of recording and reproduction device 200 or changing the state of a recording medium to be recordable.

The formats of CEC commands will be described below. FIGS. 8, 9, and 10 show an example of three types of vender unique CEC command formats used in time shift viewing/listening system 15 according to the embodiment of the invention. FIG. 8 shows an example of the CEC command format of the channel selection command. FIG. 9 shows an example of the CEC command format of the time shift viewing/listening start command. FIG. 10 shows an example of the CEC command format of the time shift viewing/listening result notice command. The transmission direction, the instruction details, the transmission information, and the receiver response details of the commands will be described below.

The channel selection command shown in FIG. 8 is a command instructing to select a digital channel transmitted from display device 100 to recording and reproduction device 200 in step S402 of FIG. 5. This channel selection command includes six-byte information of "transport stream ID (Transport_Stream_ID)", "service ID (Service_ID)", and "original network ID (Original_Network_ID)" and two-byte information of actual transmission frequency "Frequency". Recording and reproduction device 200 having received the channel selection command is in the standby state and selects the specified digital channel when it can receive the signal in broadcast.

The time shift viewing/listening start command shown in FIG. 9 is, for example, a command instructing to start the time shift viewing/listening which is transmitted from display device 100 to recording and reproduction device 200 in step S406 of FIG. 5. The time shift viewing/listening start command includes four-byte information of "Transport_Stream_ID" and "Service_ID" and eight-byte information of "video PID (Video PID)", "audio PID (Audio PID)", "mode (Mode)", "primary and secondary audio selection (Bilingual Audio Selection)", "caption PID (Subtitle PID)", and "caption language (Subtitle Language)". The "Video PID" specifies a video content for the time shift viewing/listening and a video content for the reproduction so as to satisfactorily match with each other. The "Audio PID" specifies an audio content for the time shift viewing/listening and an audio content for the reproduction so as to satisfactorily match with each other. The "Mode", the "Subtitle PID", and the "Subtitle Language" specify the existence of caption, the content, and the language setting for the time shift viewing/listening and the reproduction setting for the reproduction so as to satisfactorily match with each other. The "Bilingual Audio Selection" specifies the primary and secondary audio setting channels in the audio content for the time shift viewing/listening and the primary and secondary audio setting for the reproduction so as to satisfactorily match with each other.

Recording and reproduction device 200 having received the time shift viewing/listening start command starts the time shift viewing/listening when the time shift viewing/listening is possible under the specified condition. The result on whether the time shift viewing/listening is started is returned as a response.

The time shift viewing/listening result notice command shown in FIG. 10 is a command for returning the result on whether the time shift viewing/listening is started which is transmitted from recording and reproduction device 200 to display device 100 in step S408 of FIG. 5.

The time shift viewing/listening result notice command serves to return the result on whether the time shift viewing/listening is started by a one-byte code. Display device 100 having received the time shift viewing/listening result notice command may display the error factor (examples shown in FIG. 7) corresponding to the result on display unit 141. However, "when a request is received (Request Received)", nothing may be displayed, or a message indicating that more time is necessary for the start of the time shift viewing/listening may be displayed.

In this way, control unit 212 outputs the reception notice of the time shift viewing/listening start command from command input and output I/F 213 when determining that recording and reproduction unit 232 cannot record data at once, and transmits the recording start result from command input and output I/F 213 when the recording and reproduction unit can record data. Control unit 112 analyzes the reception notice of the time shift viewing/listening start command input from command input and output I/F 113 and displays the analysis result on the screen. Control unit 112 analyzes the notice of the recording start result based on the time shift viewing/listening result notice command and displays the analysis result on the screen of display unit 141.

As described above, according to the invention, when the content of tuner unit 122 built in display device 100 is switched, the content of tuner unit 222 built in recording and reproduction device 200 is switched to the same content as switched by tuner unit 122 built in display device 100, thereby omitting the recording content switching operation for starting the time shift viewing/listening. At the same time, the process of encoding the received signal or decoding the recorded signal with the channel selection of recording and reproduction device 200 can be omitted to record the time shift viewing/listening content without cutting off the head thereof, thereby improving the operational response.

The switching setting information of plural audio signals or the switching setting information of the caption signals included in the broadcast content being received by tuner unit 122 built in display device 100 may be transmitted to and stored in recording and reproduction device 200 along with the time shift viewing/listening start command. By causing recording and reproduction device 200 to read and switch the setting information at the time of the time shift viewing/listening, it is possible to continuously reproduce the audio signal or the caption signal, which is selected by the user's operation during the viewing/listening, during the time shift viewing/listening.

At the time of starting the time shift viewing/listening, that is, when the input path of display device 100 is switched to data output I/F 225 which is the signal output terminal of recording and reproduction device 200, display device 100 can display a pause picture of recording and reproduction device 200 on the screen of display unit 141 and can display the reproducing operation guide of recording and reproduction device 200, thereby improving the user's operability.

When the time shift viewing/listening fails, the error factor can be displayed on the screen of display device 100 and the input switching process from display device 100 to recording and reproduction device 200 can be omitted, thereby improving the operational response. By notifying the user of the reason of the failure of the time shift viewing/listening, it is possible to rapidly take a countermeasure of re-setting the state of recording and reproduction device 200 or changing the recording medium to a recordable state.

When the input path of display device 100 is switched to a signal output terminal other than recording and reproduction device 200 by the user's instruction during the time shift viewing/listening, it can be determined that the user stops the viewing/listening of the corresponding broadcast program. Accordingly, the recording of the broadcast program into recording and reproduction device 200 may be stopped at that time. For example, this is the case where the user connects another external device not included in time shift viewing/listening system 15, such as a DVR or a set-top box (STB) or a personal computer (PC) having a function of outputting a video signal, to the external input terminal of the television receiver, selects the external input with the remote controller of the television receiver, and views the reproduced video from the DVR, in the course of recording the broadcast program received by tuner unit 222 in the DVD for the purpose of the time shift viewing/listening. In this way, when the input path of display device 100 is switched to the signal output terminal of another external device, display device 100 senses the output of the video and audio data from the signal output terminal of the first tuner unit or another external device and issues the output start notice command notifying recording and reproduction device 200 of the sensed output. Recording and reproduction device 200 stops the recording based on the output start notice command.

Although it has been described in this embodiment that the channel selection command is transmitted from display device 100 to recording and reproduction device 200 when the channel of tuner unit 122 of display device 100 is switched, the channel selection command may be transmitted at the same time as transmitting the time shift viewing/listening start command. Accordingly, the channel selection command and the time shift viewing/listening start command can be transmitted at the same timing, thereby simplifying the communication control.

In this embodiment, the reception of the time shift viewing/listening start command corresponds to the parameter "Request Received" of the time shift viewing/listening result notice command described with reference to FIG. 10, and means that recording and reproduction device 200 receives the time shift viewing/listening start command without notifying the result of the recording. In this case, a message of "please wait for a moment" may be displayed on the screen or message may not be displayed.

INDUSTRIAL APPLICABILITY

The invention can be usefully and widely used to record contents in a time shift manner in a viewing/listening system including a display device and a recording and reproduction device.

The invention claimed is:

1. A time shift viewing/listening system comprising:
a display device; and
a recording and reproduction device connected to the display device,
  wherein the display device includes:
  a first tuner unit receiving a broadcast wave and outputting a content;
  an operation input unit inputting a broadcast channel switching instruction and a time shift viewing/listening instruction of the content received by the first tuner unit;
  a content input unit inputting a content from the recording and reproducing device;
  a first input switching unit switching an input path of a content between the first tuner unit and the content input unit;
  a display unit displaying the content input from the first input switching unit;
  a first command input and output unit inputting a command from the recording and reproduction device and outputting a command to the recording and reproduction device; and
  a first control unit making a control of switching a broadcast channel of the content received by the first tuner unit based on the broadcast channel switching instruction input from the operation input unit, a control of outputting a channel selection command including information of the switched broadcast channel from the first command input and output unit, a control of outputting a time shift viewing/listening start command instructing to start the time shift viewing/listening from the first command input and output unit based on the time shift viewing/listening instruction, and a control of switching the input switching unit in response to a video output start command input from the first command input and output unit, and
  wherein the recording and reproduction device includes:
  a second tuner unit receiving a broadcast wave and outputting a content;
  a recording and reproduction unit converting the content input from the second tuner unit into recording data and recording and reproducing the recording data;
  a content output unit outputting recording data of the content, which is recorded in the recording and reproduction unit, to the content input unit of the display device;
  a second command input and output unit inputting a command from the first command input and output unit and outputting a command to the first command input and output unit; and
  a second control unit making a control of selecting a channel of the second tuner unit in response to the channel selecting command input from the second command input and output unit, a control of recording and reproducing a content in and from the recording and reproduction device in response to the time shift viewing/listening start command and outputting a content from the content output unit, and a control of outputting an output start notice command instructing to switch the input path of the content in the display device from the first tuner unit to the content input unit from the second command input and output unit,
  wherein the first control unit makes a control of outputting caption switching information set for the content, which is being received by the first tuner unit, from the first command input and output unit at the time of outputting the time shift viewing/listening start command.

2. A time shift viewing/listening system comprising:
a display device; and
a recording and reproduction device connected to the display device,
  wherein the display device includes:
  a first tuner unit receiving a broadcast wave and outputting a content;
  an operation input unit inputting a broadcast channel switching instruction and a time shift viewing/listening instruction of the content received by the first tuner unit;
  a content input unit inputting a content from the recording and reproducing device;
  a first input switching unit switching an input path of a content between the first tuner unit and the content input unit;
  a display unit displaying the content input from the first input switching unit;
  a first command input and output unit inputting a command from the recording and reproduction device and outputting a command to the recording and reproduction device; and
  a first control unit making a control of switching a broadcast channel of the content received by the first tuner unit based on the broadcast channel switching instruction input from the operation input unit, a control of outputting a channel selection command including information of the switched broadcast channel from the first command input and output unit, a control of outputting a time shift viewing/listening start command instructing to start the time shift viewing/listening from the first command input and output unit based on the time shift viewing/listening instruction, and a control of switching the input switching unit in response to a video output start command input from the first command input and output unit, and
  wherein the recording and reproduction device includes:
  a second tuner unit receiving a broadcast wave and outputting a content;
  a recording and reproduction unit converting the content input from the second tuner unit into recording data and recording and reproducing the recording data;
  a content output unit outputting recording data of the content, which is recorded in the recording and reproduction unit, to the content input unit of the display device;
  a second command input and output unit inputting a command from the first command input and output unit and outputting a command to the first command input and output unit; and
  a second control unit making a control of selecting a channel of the second tuner unit in response to the channel selecting command input from the second command input and output unit, a control of recording and reproducing a content in and from the recording and reproduction device in response to the time shift viewing/listening start command and outputting a content from the content output unit, and a control of outputting an output start notice command instructing to switch the input path of the content in the display device from the first tuner unit to the content input unit from the second command input and output unit, wherein the display device senses an output of video and audio data from the first tuner unit or a signal output terminal of another external device and issues the output start notice command to the recording and reproduction device, when the input path of the display device is switched to the signal output terminal of the another external device, and wherein the recording and reproduction device stops the recording based on the output start notice command.

3. A time shift viewing/listening system comprising:
a display device; and
a recording and reproduction device connected to the display device,
wherein the display device includes:
a first tuner unit receiving a broadcast wave and outputting a content;
an operation input unit inputting a broadcast channel switching instruction and a time shift viewing/listening instruction of the content received by the first tuner unit;
a content input unit inputting a content from the recording and reproducing device;
a first input switching unit switching an input path of a content between the first tuner unit and the content input unit;
a display unit displaying the content input from the first input switching unit;
a first command input and output unit inputting a command from the recording and reproduction device and outputting a command to the recording and reproduction device; and
a first control unit making a control of switching a broadcast channel of the content received by the first tuner unit based on the broadcast channel switching instruction input from the operation input unit, a control of outputting a channel selection command including information of the switched broadcast channel from the first command input and output unit, a control of outputting a time shift viewing/listening start command instructing to start the time shift viewing/listening from the first command input and output unit based on the time shift viewing/listening instruction, and a control of switching the input switching unit in response to a video output start command input from the first command input and output unit, and
wherein the recording and reproduction device includes:
a second tuner unit receiving a broadcast wave and outputting a content;
a recording and reproduction unit converting the content input from the second tuner unit into recording data and recording and reproducing the recording data;
a content output unit outputting recording data of the content, which is recorded in the recording and reproduction unit, to the content input unit of the display device;
a second command input and output unit inputting a command from the first command input and output unit and outputting a command to the first command input and output unit; and
a second control unit making a control of selecting a channel of the second tuner unit in response to the channel selecting command input from the second command input and output unit, a control of recording and reproducing a content in and from the recording and reproduction device in response to the time shift viewing/listening start command and outputting a content from the content output unit, and a control of outputting an output start notice command instructing to switch the input path of the content in the display device from the first tuner unit to the content input unit from the second command input and output unit, wherein the second control unit outputs an error factor of non-recordable from the second command output unit when determining that the recording and reproduction unit cannot perform a recording operation, and wherein the first control unit makes a control of analyzing the error factor of non-recordable input from the first command input and output unit and displaying the analysis result on a screen.

4. A time shift viewing/listening system comprising:
a display device; and
a recording and reproduction device connected to the display device,
wherein the display device includes:
a first tuner unit receiving a broadcast wave and outputting a content;
an operation input unit inputting a broadcast channel switching instruction and a time shift viewing/listening instruction of the content received by the first tuner unit;
a content input unit inputting a content from the recording and reproducing device;
a first input switching unit switching an input path of a content between the first tuner unit and the content input unit;
a display unit displaying the content input from the first input switching unit;
a first command input and output unit inputting a command from the recording and reproduction device and outputting a command to the recording and reproduction device; and
a first control unit making a control of switching a broadcast channel of the content received by the first tuner unit based on the broadcast channel switching instruction input from the operation input unit, a control of outputting a channel selection command including information of the switched broadcast channel from the first command input and output unit, a control of outputting a time shift viewing/listening start command instructing to start the time shift viewing/listening from the first command input and output unit based on the time shift viewing/listening instruction, and a control of switching the input switching unit in response to a video output start command input from the first command input and output unit, and
wherein the recording and reproduction device includes:
a second tuner unit receiving a broadcast wave and outputting a content;
a recording and reproduction unit converting the content input from the second tuner unit into recording data and recording and reproducing the recording data;
a content output unit outputting recording data of the content, which is recorded in the recording and reproduction unit, to the content input unit of the display device;
a second command input and output unit inputting a command from the first command input and output unit and outputting a command to the first command input and output unit; and
a second control unit making a control of selecting a channel of the second tuner unit in response to the channel selecting command input from the second command input and output unit, a control of recording and reproducing a content in and from the recording and reproduction device in response to the time shift viewing/listening start command and outputting a content from the content output unit, and a control of outputting an output start notice command instructing to switch the input path of the content in the display device from the first tuner unit to the content input unit from the second command input and output unit, wherein the second control unit outputs a notice that the time shift viewing/listening start command is received from the second command output unit when determining that the recording and reproduction unit cannot perform a recording operation at once, and outputs a recording start result from the second command output unit when the recording and reproduction unit can perform a recording operation again, and wherein the first control unit makes a control of:

analyzing the notice of reception of the time shift viewing/listening start command input from the first command input and output unit and displaying the analysis result on a screen; and analyzing the notice of the recording start result based on a time shift viewing/listening result notice command and displaying the analysis result on the screen.

* * * * *